(12) United States Patent
Wollny et al.

(10) Patent No.: US 12,204,401 B2
(45) Date of Patent: Jan. 21, 2025

(54) SYSTEMS AND METHODS FOR DATA-DRIVEN PROACTIVE DETECTION AND REMEDIATION OF ERRORS ON ENDPOINT COMPUTING SYSTEMS

(71) Applicants: Johannes Wollny, Mönchengladbach (DE); Christian Winnesberg, Mülheim (DE); Adrian Mares, Toronto (CA); Laura Rosich, London (GB); Eugenia Torres, Heredia (CR); Jason Tong, Toronto (CA)

(72) Inventors: Johannes Wollny, Mönchengladbach (DE); Christian Winnesberg, Mülheim (DE); Adrian Mares, Toronto (CA); Laura Rosich, London (GB); Eugenia Torres, Heredia (CR); Jason Tong, Toronto (CA)

(73) Assignee: MCKINSEY & COMPANY, INC., New York, NY (US)

( * ) Notice: Subject to any disclaimer, the term of this patent is extended or adjusted under 35 U.S.C. 154(b) by 176 days.

(21) Appl. No.: 17/530,588

(22) Filed: Nov. 19, 2021

(65) Prior Publication Data

US 2023/0161662 A1     May 25, 2023

(51) Int. Cl.
*G06F 11/00*     (2006.01)
*G06F 11/07*     (2006.01)
(Continued)

(52) U.S. Cl.
CPC ...... *G06F 11/0793* (2013.01); *G06F 11/0706* (2013.01); *G06F 11/0754* (2013.01);
(Continued)

(58) Field of Classification Search
CPC ............ G06F 11/0703; G06F 11/0706; G06F 11/0751; G06F 11/0754; G06F 11/0766;
(Continued)

(56) References Cited

U.S. PATENT DOCUMENTS 6,757,837 B1 * 6/2004 Platt ..................... G06F 11/0793
714/38.14
10,127,125 B2 * 11/2018 Krishnan ............ G06F 11/0751
(Continued)

FOREIGN PATENT DOCUMENTS

WO     WO-0045266 A1 * 8/2000 .......... G06F 11/3495

*Primary Examiner* — Philip Guyton
(74) *Attorney, Agent, or Firm* — MARSHALL, GERSTEIN & BORUN LLP (57) ABSTRACT

Systems and methods for proactive support of computing assets are presented. In contrast to existing techniques of reactive support, the proactive support techniques disclosed herein automatically collect operating data from a plurality of computing devices, analyze the operating data to identify predictive indicators associated with error conditions, identify a subset of affected computing devices that match the predictive indicators, and execute corrective scripts to remediate or avoid such error conditions before problems are experienced on the affected computing devices. The operating data may be used to train a machine learning model in order to identify the predictive indicators associated with each error condition. In some embodiments, the corrective scripts may be automatically generated to adjust operating parameters or applications of the affected computing devices based upon the identified predictive indicators.

20 Claims, 4 Drawing Sheets

(51) Int. Cl.
   *G06F 11/22*       (2006.01)
   *G06F 18/214*      (2023.01)
   *G06N 20/00*       (2019.01)

(52) U.S. Cl.
   CPC ...... *G06F 11/0772* (2013.01); *G06F 11/0787*
         (2013.01); *G06F 11/2257* (2013.01); ***G06F
         11/2263* (2013.01); *G06F 18/214*** (2023.01);
               *G06N 20/00* (2019.01); *G06F 2201/81*
                                                   (2013.01)

(58) Field of Classification Search
   CPC ............ G06F 11/0772; G06F 11/0787; G06F
               11/2257; G06F 11/2263; G06F 18/214;
                           G06F 2201/81; G06N 20/00
   See application file for complete search history.

(56) References Cited

U.S. PATENT DOCUMENTS

| | | | |
|---|---|---|---|
| 11,483,328 B2 * | 10/2022 | Kirti | ................... H04L 63/1425 |
| 2004/0148152 A1 * | 7/2004 | Horikawa | ........... G06F 11/3466 |
| | | | 703/22 |
| 2013/0227352 A1 * | 8/2013 | Kumarasamy | ...... G06F 11/3006 |
| | | | 714/47.1 |
| 2019/0065990 A1 * | 2/2019 | Sharma | .................. G06Q 20/00 |

\* cited by examiner

SYSTEMS AND METHODS FOR DATA-DRIVEN PROACTIVE DETECTION AND REMEDIATION OF ERRORS ON ENDPOINT COMPUTING SYSTEMS

FIELD OF THE DISCLOSURE

The present disclosure relates to support and maintenance of computing devices and more particularly to proactive identification and correction of error conditions of endpoint computing system using predictive analytics.

BACKGROUND

As computing systems and ecosystems have become more powerful and complex, the potential for errors has likewise increased. Error conditions may arise from various sources, such as mismatches between software versions or configurations and device hardware, security restrictions, account settings, or other software applications. Other error conditions may arise within a single software application, such as previously unknown or unpatched security vulnerabilities or other software bugs. State-dependent error conditions involving multiple applications, parameters, or hardware configurations, however, present particular difficulties for detection and remediation due to their low rate of occurrence. Such difficulties become especially acute in enterprise environments with many interconnected software applications and hardware devices. Further complicating support of such systems, the various computing devices (e.g., end-user computing devices) may be distributed across remote locations, while the software systems frequently require near-constant availability. As a result of these factors, enterprises expend significant resources on upgrading and fixing malfunctioning software and hardware each year. Traditional approaches to detecting and correcting problems are reactive, waiting until a user experiences an error condition. Such reactive approaches result in unscheduled and unpredictable downtime for users, devices, systems, applications, and platforms. Improved techniques for predicting and remediating potential error conditions in computing systems are therefore needed in order to reduce system errors and unavailability.

SUMMARY

The present invention solves problems relating to identification and correction of error conditions in computing systems by identifying predictive indicators of such error conditions and implementing proactive corrective actions to avoid such error conditions. In contrast to the previous reactive approaches, the proactive techniques described herein automatically collect and analyze operating data from many computing devices (e.g., endpoint computing devices associated with end users) to predict factors contributing to error conditions, then perform corrective actions on computing devices found to have such predicted factors before such computing devices exhibit such error conditions.

The techniques described herein may include a method performed by a server or other computing system, such method comprising: collecting operating data from a plurality of computing devices; generating a device status data set comprising a plurality of entries for each of the plurality of computing devices based at least in part upon the operating data; identifying one or more predictive indicators associated with an error condition based upon the device status data set; identifying a subset of the plurality of computing devices comprising one or more affected computing devices matching the one or more predictive indicators; sending a corrective script to each of the one or more affected computing devices to adjust operation relating to at least one of the one or more predictive indicators to avoid the error condition; and/or causing the corrective script to be executed for each of the one or more affected computing devices to adjust operation of the respective affected computing device to remediate the error condition.

The device status data set may comprise normal operating entries for each of the computing devices and error condition entries for at least some of the computing devices. In some embodiments, the operating data for each of the plurality of computing devices may include a log of events occurring during operation of the respective computing device, a hardware profile for the respective computing device, and/or a list of adjustable operating parameters of the respective computing device. The operating data may be collected from the plurality of computing devices by installing one or more data collection agents on each of the plurality of computing devices, such that the data collection agents execute to send event logs of events at the respective computing device. The operating data including the event logs may then be received from the one or more data collection agents for each computing device via communication through a network.

Identifying the one or more predictive indicators may comprise training a machine learning model. In such embodiments, a machine learning model may be trained using the device status data set to predict each of a plurality of error conditions indicated by the error condition entries within the device status data set. The one or more predictive indicators may then be determined based upon the trained machine learning model, where the one or more predictive indicators are input variables within the trained machine learning model.

In some embodiments, each of the affected computing devices may be identified using the predictive indicators by generating a predicted error condition score for each of the one or more affected computing devices, then determining the respective predicted error condition score of each affected computing devices exceeds a threshold.

To avoid or correct the error condition in each of the affected computing devices, the corrective script is executed for each of the affected computing devices. Such corrective script may be executed by the server or other computing system to remotely adjust aspects of operation of such affected computing device (e.g., by changing settings, providing updates, or adjusting security permissions), or the corrective script may be sent to such affected computing device to be run by the affected computing device. Thus, in some embodiments, causing the corrective script to be executed for each respective affected computing device comprises remotely controlling the affected computing device to run the corrective script in an administrator session with elevated permissions while the affected computing device is not otherwise being used. In further embodiments, the corrective script may be executed by one or more data collection agents operating on each affected computing device. Such data collection agents may detect one or more trigger conditions associated with the corrective script, then execute the corrective script upon detection of the one or more trigger conditions. Thus, conditional corrective scripts may be executed upon the occurrence of relevant trigger conditions, even if the affected computing device is not connected to a network at the time such trigger conditions occur.

Further embodiments may use a knowledge base to facilitate efficient use of previously developed solutions to error conditions. To this end, the method may further comprise adding an indication of a preventive solution to the error condition to a knowledge base as a known solution upon formulation of the solution to one or more identified error conditions. Such indication of the preventive solution may indicate (i) the one or more predictive indicators associated with the error condition and/or (ii) the corrective script. When populated with previously formulated solutions, the knowledge base may be used for automating aspects of error condition remediation. Thus, the method may further comprise determining that a preventive solution to an identified error condition is identified in the knowledge base as a known solution based upon previous analysis. Based upon such determination, the corrective script may be selected from the knowledge base based upon the error condition and the one or more predictive indicators. In some embodiments, information in the knowledge base may be available to or sent to one or more users for review or action, including end users of affected computing devices or analysts determining solutions to identified error conditions.

Systems or computer-readable media storing instructions for implementing all or part of the methods described above may also be provided in some aspects. Such systems or computer-readable media may include executable instructions to cause one or more processors to implement part or all of the methods described above. The systems, methods, and instructions disclosed herein may be implemented by one or more servers, client computing devices, enterprise computing devices, or combinations thereof. Additional or alternative features described herein below may be included in some aspects.

BRIEF DESCRIPTION OF THE DRAWINGS

The figures described below depict various aspects of the systems and methods disclosed herein. Advantages will become more apparent to those skilled in the art from the following description of the embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive. Further, wherever possible, the following description refers to the reference numerals included in the following figures, in which features depicted in multiple figures are designated with consistent reference numerals.

DETAILED DESCRIPTION

The systems, methods, and techniques described herein solve various problems relating to the detection and correction of error conditions in computing devices. The proactive support techniques collect operating data from a plurality of computing devices (e.g., endpoint computing devices associated with end users) in an unobtrusive manner during operation, then use such operating data to identify computing devices that are or may be affected by error conditions based upon predictive indicators of such error conditions. In some embodiments, the affected computing devices may then be proactively adjusted or updated by running corrective scripts prior to the appearance of user-observable symptoms of the error conditions. In other embodiments, the affected computing devices may be provisioned with corrective scripts configured to be automatically run upon detection of a trigger condition associated with an error condition to remediate the error condition. By applying proactive support techniques, the methods and systems herein are able to reduce the interruptions and other problems associated with traditional reactive support techniques. For example, some remediation may be performed automatically in the background or while an affected computing device is otherwise not in use, thereby reducing device downtime and avoiding loss of data due to sudden failure of such affected computing devices. Moreover, in some embodiments, predictive indicators of error conditions may be generated by machine learning models to identify and correct potential error conditions without requiring specific identification of actual error conditions. For example, certain combinations of operating parameters may be predicted to increase the probability of future error conditions, allowing for corrective action to adjust some or all of the relevant operating parameters to avoid such potential error conditions without necessarily requiring analysis of the causes or operation of the underlying error conditions. Such operating parameters may be associated with hardware or software configurations, applications, settings, operating systems, or versions. Additional, fewer, or alternative aspects may be included in various embodiments, as described herein.

Figure 1A:
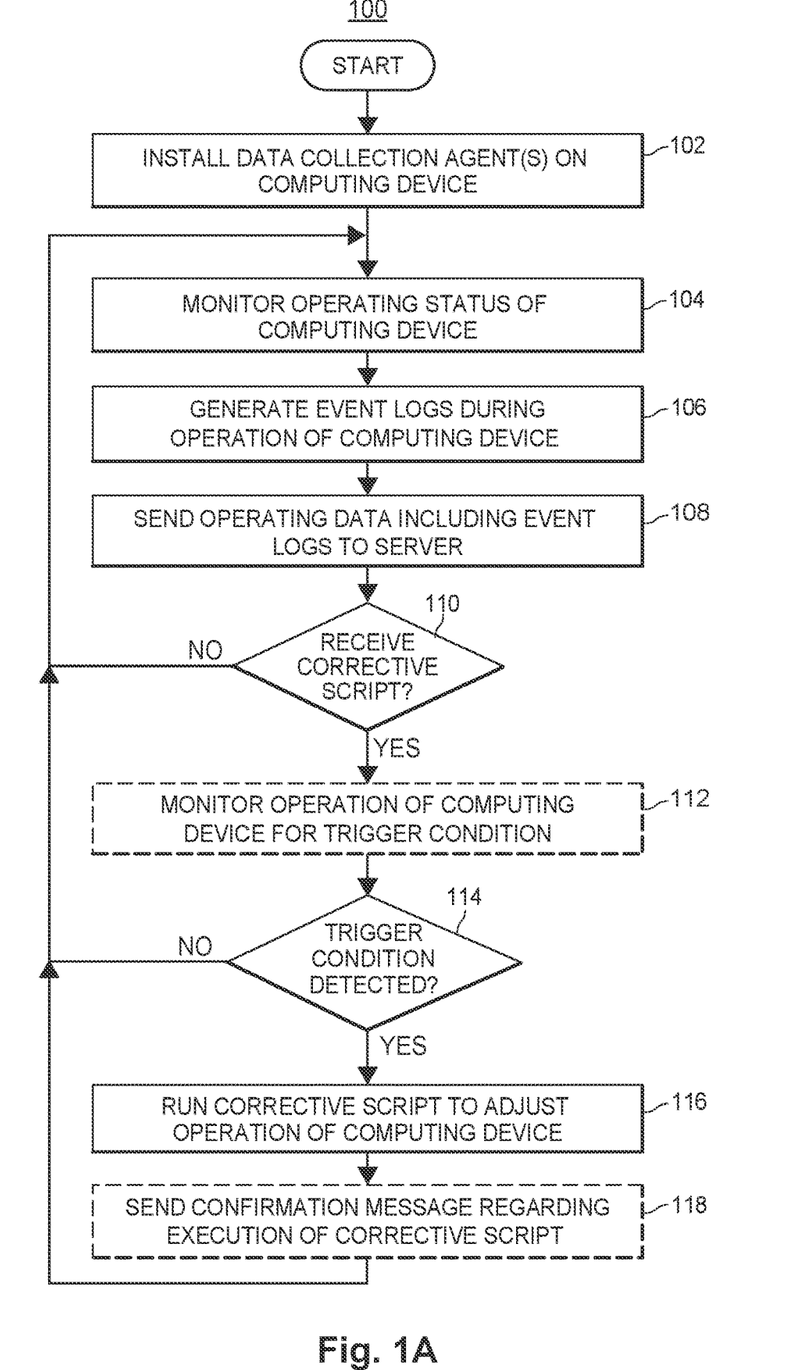
FIG. 1A illustrates a flow diagram of an exemplary monitoring method implemented at a computing device to provide operating data according to certain embodiments.
Figure 1B:
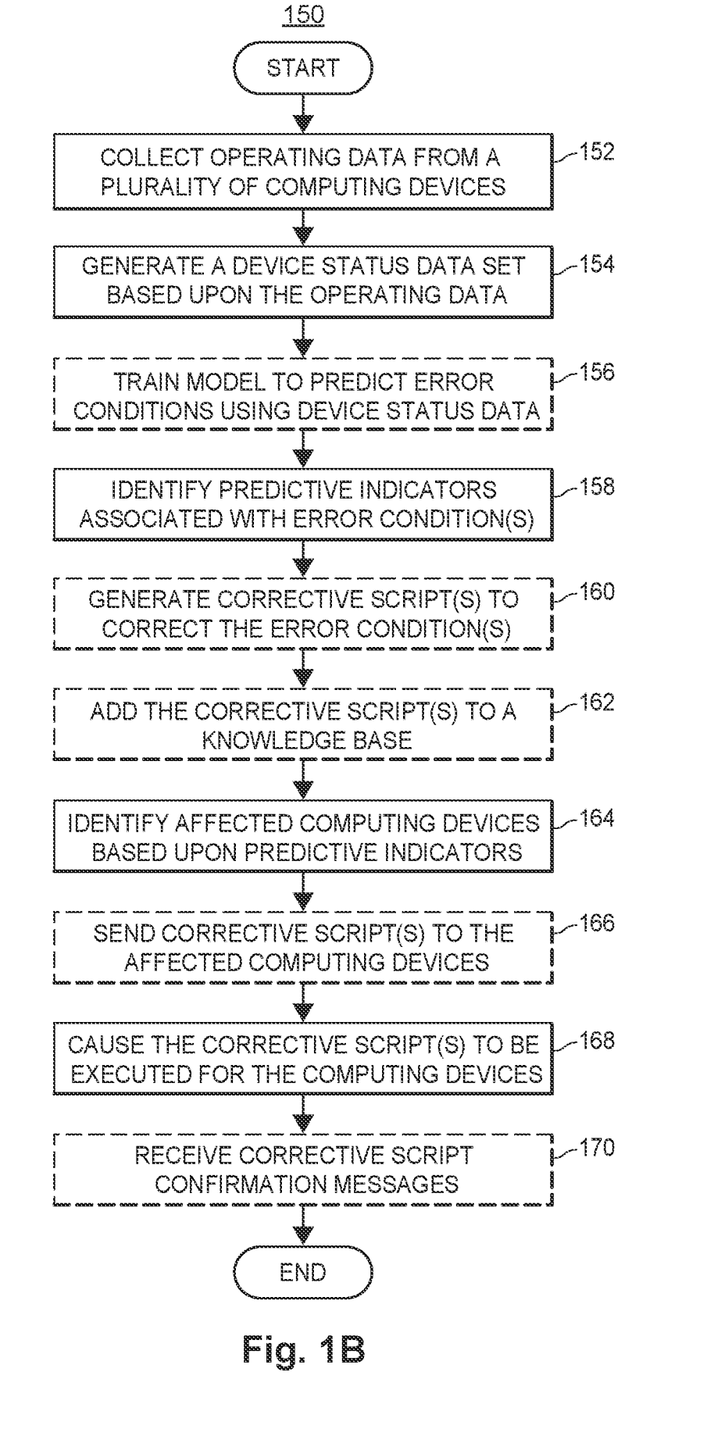
FIG. 1B illustrates a flow diagram of an exemplary proactive support method implemented at a server to predict and correct error conditions at computing devices according to certain embodiments.

FIGS. 1A-B illustrate flow diagrams of exemplary methods for monitoring operation of computing devices (e.g., endpoint computing devices associated with end users), identifying predictive indicators of error conditions that may affect some of the computing devices, and proactively remediating the operation of the computing devices to avoid the error conditions. The exemplary methods may be implemented in whole or part by processors of computing devices in coordination with processors of remote servers. Thus, each of a plurality of computing devices may implement the exemplary method of FIG. 1A to provide operating data regarding such devices to one or more servers implementing aspects of the exemplary method of FIG. 1B to identify and correct potential issues with at least some of the computing devices. These exemplary methods may be implemented by components of the exemplary computing system 300 illustrated in FIG. 3, described in further detail below. Further embodiments may include additional or alterative actions and may involve alternative configurations or components.

FIG. 1A illustrates a flow diagram of an exemplary monitoring method 100 implemented at a computing device to provide operating data and implementing certain corrective actions. The computing device may be an enterprise computing device 312 or a wireless computing device 316, as described further below. Such computing device may communicate with one or more proactive support servers 340 via a network 330, as described further below. The monitoring method 100 may be implemented at each of a plurality of computing devices in order to facilitate further analysis and remediation of error conditions.

The monitoring method 100 begins with the installation of one or more data collection agents on a computing device (block 102), which run on the computing device to monitor operating status of the computing device (block 104). The data collection agents thus generate one or more event logs of events occurring at the computing device (block 106), which may be combined with other event logs or other operating data and sent to a server for analysis (block 108). If a corrective script is received from the server (block 110), such corrective script may be executed to remediate error conditions, either immediately or at some later time. In some embodiments in which a conditional corrective script is downloaded for future use, the one or more data collection agents monitor operation of the computing device relative to one or more trigger conditions associated with the received corrective script (block 112). When a trigger condition is detected (block 114) or if an unconditional corrective script for which no trigger condition is required is received, the computing device runs the corrective script to remediate one or more error conditions (block 116). In some embodiments, the computing device further sends a confirmation message to the server indicating either successful or unsuccessful execution of the corrective script (block 118). Once the script has been received and/or run at the computing device or if either no script is received at block 110 or if a conditional script is received but no trigger condition is detected, the one or more data collection agents continue monitoring the operating status of the computing device (block 104). The method 100 is exemplary only, and other methods may include additional, fewer, or alternative actions.

At block 102, one or more data collection agents are installed on the computing device. Each data collection agent is configured to monitor and record information regarding operation of the computing device, such as system and application operations performed or attempted. These operations may be recorded in an event log as events occurring at the computing device, such as user log-in events, application launch events, application close events, error code events, memory access events, network access events, input events, output events, etc. Such data collection agents may further be configured to periodically record system operating parameters, such as configuration parameters, settings selected, versions of software installed or running, resource utilization levels, connected devices, or other similar information regarding the current status of the computing device.

At block 104, the one or more data collection agents execute on the computing device to monitor the operating status of the computing device. Monitoring the operating status includes detecting events occurring at the computing device, as well as periodically or episodically detecting operating parameters of the computing device. The one or more data collection agents run in the background on the client computing device to obtain such operating data, which may be stored in temporary files or added to one or more log files.

At block 106, the one or more data collection agents generate one or more event logs of the observed events occurring at the computing device, either periodically or upon occurrence of a trigger condition. For example, the event logs may be generated on a daily basis or may be generated prior to the computing device shutting down or restarting. In some embodiments, each data collection agent may generate a separate event log covering an interval of time, such that the event logs may separately record different aspects of operation of the computing device. This may be advantageous in continuing data collection when one of the data collection agents experiences an error and becomes unable to continue recording operating data. In further embodiments, the event logs may include or be associated with operating parameter details relevant to analysis of the recorded events, particularly for error conditions.

At block 108, the one or more data collection agents send the collected operating data to a server for further analysis. The operating data may be combined into an operating data message prior to transmission via a network to the server. In some embodiments, the operating data includes a log of events occurring during operation of the computing device, a hardware profile for the computing device, and a list of adjustable operating parameters of the computing device, each for the same time interval. Such operating data may be combined into a single event log or may be sent as a set of associated files, which may include one or more event logs. Because hardware profiles and operating parameters do not change frequently, such types of operating data may be included as separate variables in the operating data message for data efficiency, along with indications of the times and details of any changes.

At block 110, the one or more data collection agents determine whether a corrective script has been received from the server in response to the operating data sent to the server. Corrective scripts may be conditional corrective scripts configured to be executed when the one or more data collection agents detect the occurrence of one or more trigger conditions, or they may be unconditional corrective scripts intended for immediate execution. Receiving the corrective script may include receiving a message containing the corrective script or a reference to a location from which the corrective script may be obtained (e.g., a resource location on a network or a web address). Conditional corrective scripts may incorporate or may be received together with indications of trigger conditions associated with the conditional corrective scripts (i.e., observable conditions or events at the computing device that are associated with error conditions to be remediated by the conditional corrective scripts). In some embodiments, one data collection agent may handle communication with the server, including sending operating data messages and receiving and running corrective scripts. If no corrective script is received, the data collection agents continue monitoring operation of the computing device at block 104. If a corrective script is received, such corrective script is run at block 116 (either immediately in the case of an unconditional corrective script or upon occurrence of a trigger condition in the case of a conditional corrective script) and monitoring operation of the computing device continues at block 104. In some embodiments, monitoring continues prior to execution or during execution of the corrective script in order to detect changes made by the script and provide event data for further analysis in case any errors are encountered while the corrective script is running.

At block 112, in embodiments in which a conditional corrective script is received, the one or more data collection agents monitor operation of the computing device to determine whether any trigger conditions associated with conditional corrective scripts have occurred. Such trigger conditions may be error conditions or may be observable conditions (e.g., events or operating parameters) indicative of error conditions. Thus, trigger conditions may include events occurring at the computing device (e.g., applications stopping or crashing, loss of network connections, or software license expiration), operating parameters of the computing device (e.g., startup time or processor or memory usage), or similar observable conditions occurring at the computing device, either individually or as combinations of observable conditions. In some embodiments, one of the data collection agents may be configured to monitor operation of the computing device to detect any of a plurality of trigger conditions associated with a plurality of conditional corrective scripts, then cause an appropriate corrective script to be executed by the computing device when a corresponding trigger condition is detected.

At block 114, after one or more conditional corrective scripts have been received, the one or more data collection agents determine whether one or more trigger conditions associated with one or more corrective scripts have been detected at the computing device. If no such trigger conditions have been detected, the data collection agents continue to monitor operation of the computing device and send operating data to the server for analysis. If a trigger condition is detected, one or more corresponding conditional corrective scripts are selected for execution by the computing device to avoid, correct, recover from, or otherwise remediate one or more error conditions associated with each detected trigger condition. For example, when a trigger condition of an application crash is detected, a data collection agent may cause a corresponding corrective script to automatically save temporary files associated with such application to automatically run in order to avoid loss of data in such temporary files. When at least one trigger condition is detected or when an unconditional corrective script is received, an appropriate corrective script is executed at block 116.

At block 116, the corrective script is run at the computing device to adjust operation of the computing device in order to avoid one or more error conditions identified by the server based upon the operating data. Running the corrective script may include the one or more processors of the computing device reading the corrective script and executing a series of commands contained in the corrective script. Such commands may include commands to adjust operating parameters of the operating environment of the computing device (e.g., changing settings, enabling or disabling features, or updating permissions), commands to install or uninstall software (e.g., removing problematic applications, installing application updates, or updating firmware or device drivers for the computing device or connected devices), commands to take actions regarding files (e.g., saving, deleting, replacing, or editing files within the operating system), commands to display notifications to a user of the computing device (e.g., displaying alerts prompting user action, such as updating passwords or scheduling device service to address hardware issues), or other types of commands for directly or indirectly adjusting operation of the computing device. In some embodiments, execution of the corrective script may be controlled by a remote computing device via the network, such as a computing device of an analyst or a network administrator. Thus, in some such embodiments, the remote computing device may remotely control the computing device to run the corrective script in an administrator session with elevated permissions while the affected computing device is not otherwise being used (e.g., overnight or at another time outside of ordinary business hours).

At block 118, in some embodiments, the computing device may generate and send a confirmation message to the server to indicate either successful or unsuccessful execution of the corrective script. The confirmation message may include a log file detailing changes made to the computing device and any errors encountered. Additionally or alternatively, the changes implemented by the corrective script may be recorded in the event logs of the one or more data collection agents. If the corrective script is a conditional corrective script, the confirmation message may provide information regarding the trigger condition detected prior to execution of the corrective script. Monitoring of the computing device continues at block 104 during continued operation of the computing device.

FIG. 1B illustrates a flow diagram of an exemplary proactive support method 150 implemented at one or more servers to predict and correct error conditions at computing devices according to certain embodiments, such as computing devices providing operating data according to the monitoring method 100 described above. The servers may comprise one or more proactive support servers 340, which may include enterprise servers 342 and/or cloud computing servers 344, as described further below. Such proactive support servers 340 may communicate with a plurality of computing devices (e.g., enterprise computing devices 312 and/or wireless computing devices 316) via a network 330, as described further below. In some embodiments, the one or more proactive support servers 340 may further communicate with one or more third party data sources 314 to obtain information regarding the computing devices, error conditions, or solutions to error conditions via the network 330.

The proactive support method 150 begins with collection of operating data from a plurality of computing devices (block 152) and generation of a device status data set based upon such operating data (block 154). In some embodiments, a machine learning model may be trained to identify predictive indicators of error conditions using the device status data set (block 156). One or more predictive indicators of error conditions are then identified (block 158) for further use in proactive assessment and correction of error conditions in the plurality of computing devices. In some embodiments, corrective scripts corresponding to the error conditions may be generated (block 160) and added to a knowledge base for further use (block 162). Based upon the identified predictive indicators, one or more affected computing devices are identified as a subset of the plurality of computing devices (block 164). In some embodiments, corrective scripts may be sent to the affected computing devices (block 166). Whether sent to the affected computing devices or executed remotely at a server, one or more corrective scripts are caused to run in order to adjust operation of the affected computing devices to remediate or avoid the associated error conditions (block 168). In some embodiments in which corrective scripts run on the affected computing devices, confirmation messages regarding execution of the corrective scripts may be received from such affected computing devices (block 170). The proactive support method 150 then ends but may be repeated in whole or part any number of times. The method 150 is exemplary only, and other methods may include additional, fewer, or alternative actions.

At block 152, the one or more servers collect operating data from a plurality of computing devices via a network. The operating data may comprise event logs and other device status data, such as hardware profiles or lists of adjustable operating parameters, which may be received in one or more messages from the computing devices. As described above, part or all of the operating data may be received from a plurality of data collection agents installed in the computing devices. In some embodiments, a database of computing device profiles may be accessed to obtain device profiles (e.g., hardware profiles, software profiles, or license profiles).

At block 154, the one or more servers generate a device status data set based upon the collected operating data. The device status data set is generated to comprise a plurality of entries for each of the plurality of computing devices, each of which entries may store the collected operating data or derived values generated from the operating data. In some embodiments, additional entries may be added to the device status data based upon information from other data sources, such as information relating to device support actions (e.g., error reports or support tickets from traditional device support management and reporting systems). Generating the device status data set may include combining operating data from multiple data sources, which may be updated at different times. The device status data set may further be generated over time by adding data received at different times, such as by combining periodic updates associated with separate time intervals from data collection agents of the plurality of computing devices. By generating a device status data set based upon operating data from a sufficiently large number of computing devices over a sufficiently long time interval, the device status data set will include both normal operating entries for each of the plurality of computing devices and error condition entries for at least some of the computing devices. Information regarding remediation actions previously taken and results of such actions may also be included, either from the operating data or from additional data sources associated with the computing devices (e.g., device support records).

At block 156, in some embodiments, the one or more servers may train a machine learning model to associate predictive indicators with error conditions using the device status data set to obtain a trained predictive model. The machine learning model may be trained to predict one or more error conditions indicated by error condition entries in the device status data set. In further embodiments, the predictive models may be trained to generate predicted error condition scores indicating likelihoods of computing devices experiencing error conditions based upon the device status data. Training the machine learning model to obtain a predictive model may be performed by supervised or unsupervised learning programs or algorithms. Such machine learning programs or algorithms may employ a neural network, which may be a convolutional neural network, a deep learning neural network, or a combined learning module or program that learns in two or more features or feature datasets in a particular areas of interest. The machine learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques. In some embodiments, one or more predictive model may be trained for each of a plurality of error conditions or for each of a plurality of device types (e.g., desktop computers, notebook computers, tablets, smartphones, network devices, or IoT devices). When trained, the one or more predictive models may be stored for further use. In some embodiments, training the one or more machine learning models may be performed by cloud computing servers 344 due to the computational demands of machine learning programs and algorithms.

At block 158, one or more predictive indicators associated with one or more error conditions are identified at the one or more servers. Such predictive indicators are values of one or more entries in the device status data set that, separately or in combination, are associated with an error condition, such that the presence of such predictive indicators in the entries associated with a particular computing device predicts an increased probability of the computing device experiencing the error condition. The predictive indicators may include device status indicators, such as hardware or software features, configurations, parameters, versions, or settings. Additionally or alternatively, the predictive indicators may include operating data patterns, such as combinations of entries in event logs received from data collection agents of computing devices associated with one or more error conditions. In some embodiments, the predictive indicators are automatically identified by selecting one or more input variables from a trained machine learning model. For efficiency and robustness, the predictive indicators may be limited to the most salient input variables (i.e., the features having the highest predictive value) in the trained machine learning model, which may be limited to a set number or to those input variables having predictive values above a threshold level. In further embodiments, the one or more error conditions may be identified by detecting features common to all computing devices having experienced a particular error condition, which may be identified from a trained machine learning model or by direct comparison of entries associated with computing devices affected by the error condition in the device status data set. In yet further embodiments, additional or alternative analysis may be performed to identify predictive indicators associated with observed or potential error conditions, such as static or dynamic statistical analysis of features of the operating data associated with one or more error conditions. This may include analyzing trends in error conditions to determine predictive indicators exhibiting increasing frequency of association with error conditions, either generally or for selected error conditions. Some error conditions may be selected or targeted as known error conditions, vulnerabilities, exploits, or bugs through third party data sources 314 (e.g., software vendors or security consultants).

At block 160, in some embodiments, one or more corrective scripts may be generated at the one or more servers to correct or avoid one or more error conditions associated with the identified predictive indicators. Such corrective scripts comprise sets of instructions or commands to perform actions to adjust one or more aspects of operation of computing devices that have been identified as being associated with predictive indicators of error conditions. As discussed above, the corrective scripts may be either conditional corrective scripts or unconditional corrective scripts. For conditional corrective scripts, trigger conditions are identified, which trigger conditions may be based upon the identified predictive indicators and may in some cases may be one or more of the identified predictive indicators. The corrective scripts may be generated to run on the computing device being adjusted or to be run on a remote computing device (e.g., a server in communication with the computing device being adjusted) in order to adjust an aspect of operation of the computing device. In some embodiments, the corrective scripts may be automatically generated based upon the predictive indicators. For example, a corrective script may be generated to adjust settings or configuration options of hardware or software components of affected computing devices to reduce or eliminate the probability of an error condition at such computing devices. Thus, if a combination of software versions of multiple software applications is identified as a predictive indicator, a corrective script may be automatically generated to update or revert to alternative versions of one or both of the software applications. In further embodiments, the corrective scripts may be generated based upon information relating to known solutions to error conditions (e.g., software patches) retrieved from third party resource repositories (e.g., third party data sources 314). In yet further embodiments, components of the corrective scripts may be retrieved from a knowledge base storing previously determined solutions for known error conditions, which may be combined into a corrective script.

At block 162, in some embodiments, the one or more corrective scripts may be added to a knowledge base to be stored for future use. The corrective scripts may be stored in the knowledge base in a manner associated with one or more error conditions or predictive indicators to facilitate later selection and use. In some embodiments, an indication of a preventive solution to an error condition associated with the one or more corrective scripts may be added to the knowledge base as a known solution to the error condition. Such indication of a preventive solution may include an indication of one or more predictive indicators associated with the error condition and an indication of the corrective script (e.g., a copy of the corrective script or a link to the corrective script). In further embodiments, additional information regarding the corrective scripts may be added to the knowledge base, such as descriptive information regarding the solution or error condition associated with a corrective script. Such additional information may include manually input descriptions or comments relating to the corrective script.

At block 164, the one or more servers identify one or more affected computing devices as a subset of the plurality of computing devices based upon the identified predictive indicators associated with one or more error conditions. The affected computing devices may be identified as currently matching or potentially matching the one or more identified predictive indicators associated with one or more particular error conditions of interest or as matching identified predictive indicators associated with general error conditions. The affected computing devices may be determined to match the one or more predictive indicators based upon operating data received from the affected computing devices (e.g., entries in the device status data set or additional operating data received from data collection agents of the affected computing devices). In some embodiments, the affected computing devices may be identified as computing devices running software associated with an error condition (e.g., an operating system or application for which a conditional or unconditional corrective script exists), computing devices having hardware associated with an error condition, or computing devices associated with user accounts identified as having current or potential future error conditions. For example, all computing devices having a certain software application installed may be identified as the affected computing devices for a conditional corrective script that runs upon occurrence of a trigger condition associated with such software application. In further embodiments, the affected computing devices may be identified based upon predicted error condition scores. In such embodiments, one or more predicted error condition scores may be generated for each of the computing devices under consideration (e.g., the computing devices currently in use or for which recent operating data is available in the device status data set) by applying one or more predictive models (e.g., trained machine learning models) to the operating data associated with such computing device. The affected computing devices may then be selected by determining the computing devices with predicted error correction scores exceeding a threshold.

At block 166, in some embodiments in which the corrective scripts are configured for execution by the computing devices, one or more corrective scripts may be sent from the one or more servers to the affected computing devices to correct the one or more error conditions associated with the predictive indicators. As described above, such corrective scripts may be configured to adjust aspects of operation of the affected computing devices relating to one or more of the predictive indicators in order to avoid or remediate the one or more error conditions associated with such predictive indicators. The corrective scripts may be selected for the one or more error conditions from corrective scripts previously generated, or the corrective scripts may be generated based upon the error conditions associated with the predictive indicators. In some embodiments, the corrective scripts may be selected from a knowledge base. In such embodiments, the one or more servers may determine a preventive solution to one or more error conditions associated with the identified predictive indicators that is indicated in the knowledge base as a known solution to the error condition based upon previous analysis. A corrective script associated with the determined solution may then be selected from the knowledge base based upon the corresponding error condition and the predictive indicators associated with the affected computing device.

At block 168, the one or more servers cause one or more corrective scripts to be executed for each of the one or more affected computing devices to correct the error condition by adjusting aspects of operation of the affected computing devices. The one or more corrective scripts may be selected or generated for the affected computing devices as described above in order to avoid or remediate one or more error conditions associated with the affected computing devices based upon the identified predictive indicators. In embodiments in which corrective scripts have been sent to the affected computing devices, causing the corrective scripts to be executed may include commanding one or more data collection agents of the affected computing devices to cause such affected computing devices to run the corrective scripts locally at such affected computing devices. Where such corrective scripts are conditional corrective scripts, the one or more servers may communicate with one or more data collection agents of the affected computing devices to cause the data collection agents to monitor operation of the affected computing devices for trigger conditions and run the conditional corrective scripts when the corresponding trigger conditions are detected during monitoring. In other embodiments, the corrective scripts may be run at the one or more servers or other computing devices in order to make changes to the operation of the affected computing devices. This may include remotely controlling the affected computing devices to run the corrective script in an administrator session with elevated permissions while the affected computing device is not otherwise being used (e.g., overnight or at another time outside of ordinary business hours).

At block 170, in some embodiments, confirmation messages from the affected computing devices indicating completion status of the corrective scripts may be received by the one or more servers. In such embodiments, successful completion or errors may be recorded for each affected computing device, from which reports may be generated for further analysis and to identify affected computing devices requiring further corrective action (e.g., manual analysis and correction). In further embodiments, operating data related to detection of trigger conditions and execution of conditional corrective scripts corresponding to such trigger conditions may be included in one or more confirmation messages. The proactive support method 100 then ends.

Figure 2:
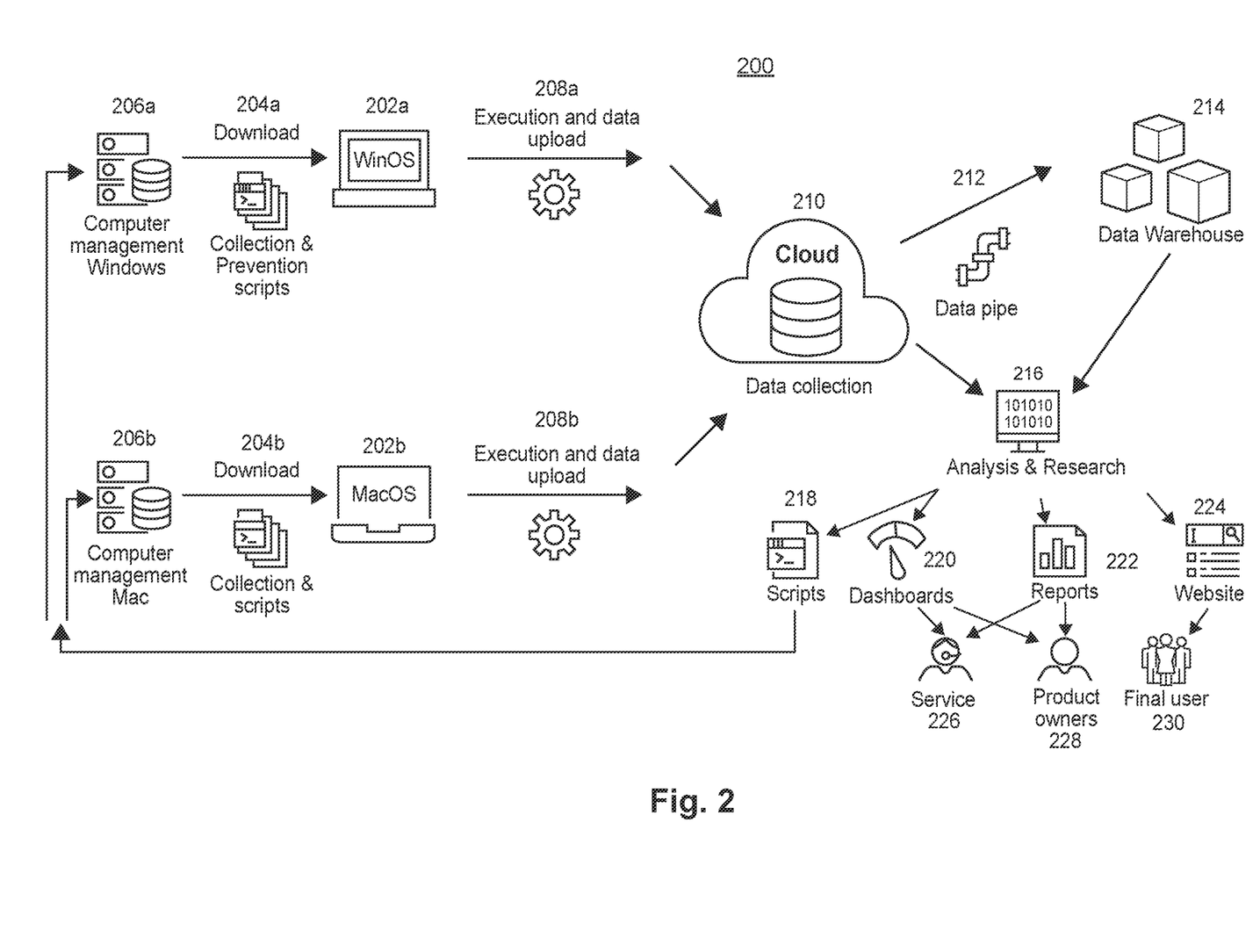
FIG. 2 illustrates a data flow diagram of an exemplary proactive support implementation for a plurality of computing devices according to certain embodiments.

FIG. 2 illustrates a data flow diagram of an exemplary proactive support implementation 200 for providing proactive support to a plurality of computing devices (e.g., endpoint computing devices associated with end users). The illustrated proactive support implementation 200 shows various aspects of data flow within a system configured for proactive support of computing devices according to the techniques described herein, such as the exemplary computing system 300 described below. Although only one example of each component is shown for clarity, any number of each of the components may be included in various embodiments. Furthermore, alternative embodiments may be configured to contain additional, alternative, or fewer components.

The exemplary proactive support implementation 200 comprises a plurality of computing devices 202 having various operating systems, which are divided into Windows OS computing devices 202a and MacOS computing devices 202b. Other types of computing devices 202 with other types of operating systems (e.g., iOS, Linux, Unix, or Android) may be included in other embodiments, but two computing devices 202a and 202b are illustrated to indicate that separate data collection and error condition correction paths may be needed for computing devices with different operating systems. Thus, Windows OS computing devices 202a may download and run data collection scripts 204a from a Windows computer management server 206a, while MacOS computing devices 202b may download and run data collection scripts 204b from a Mac computer management server 206b. The computing devices 202 may then run their respective data collection scripts 204, which may directly collect operating data or may install data collection agents to collect operating data. However collected, the operating data from the Windows OS computing devices 202a is sent to the proactive support servers for analysis via a data upload 208a, and the operating data from the MacOS computing devices 202b is sent to the proactive support servers for analysis via a data upload 208b. As shown, operating data from all computing devices 202 may be sent to the same data collection interface 210, which may be a cloud interface of a cloud computing environment.

The operating data received by the data collection interface 210 may be sent via a data pipeline 212 to a data warehouse 214 for storage. The operating data may be stored in one or more data stores (e.g., SQL or NoSQL databases) of the data warehouse 214 for further analysis by an analysis and research interface 216. Part or all of the received operating data may additionally be provided directly to the analysis and research interface 216 in order to provide current analytics, such as providing dashboards 220 of current operating status data to service users 226 (e.g., network or device analysts monitoring real-time system performance on an ongoing basis). The analysis and research interface 216 may also obtain operating data from the data warehouse 214, which may be analyzed to perform aspects of the proactive support techniques described herein (e.g., training machine learning models, identifying predictive indicators, generating corrective scripts, or identifying affected computing devices). To perform such proactive support actions, the analysis and research interface 216 may be implemented by one or more proactive support servers (e.g., the proactive support servers 340 of FIG. 3).

The proactive support servers implementing the analysis and research interface 216 may be configured to provide the dashboards 220, generate reports 222 (e.g., reports regarding trends or identifying particular error conditions in software or hardware components of the monitored computing devices 202), and provide a website 224 that may be accessed by users 230 to obtain additional information regarding known error conditions or solutions. Such website 224 may provide a user interface to a knowledge base developed at least in part through analysis of the operating data stored in the data warehouse 214. The various reports 222 may be generated for service users 226 for use in analyzing and correcting error conditions, as well as for product owners 228 for use in patching or avoiding problems with particular software or hardware products. Additionally, the analysis and research interface 216 may generate, select, or receive corrective scripts 218 to be sent to the computing device 202, as described elsewhere herein. The corrective scripts 218 may be associated with specific operating systems, such that corrective scripts for Windows OS computing devices 202a are sent or implemented through the Windows computer management server 206a, while corrective scripts for MacOS computing devices 202b are sent or implemented through the Mac computer management server 206b. In some embodiments, the corrective scripts 218 may then be downloaded to the computing devices 202 from the computer management servers 206. Data collection agents of the computing devices may then run the corrective scripts 218, either immediately or upon detection of a trigger condition. In further embodiments, the computer management servers 206 may execute the corrective scripts to adjust operation of the computing devices 202.

Figure 3:
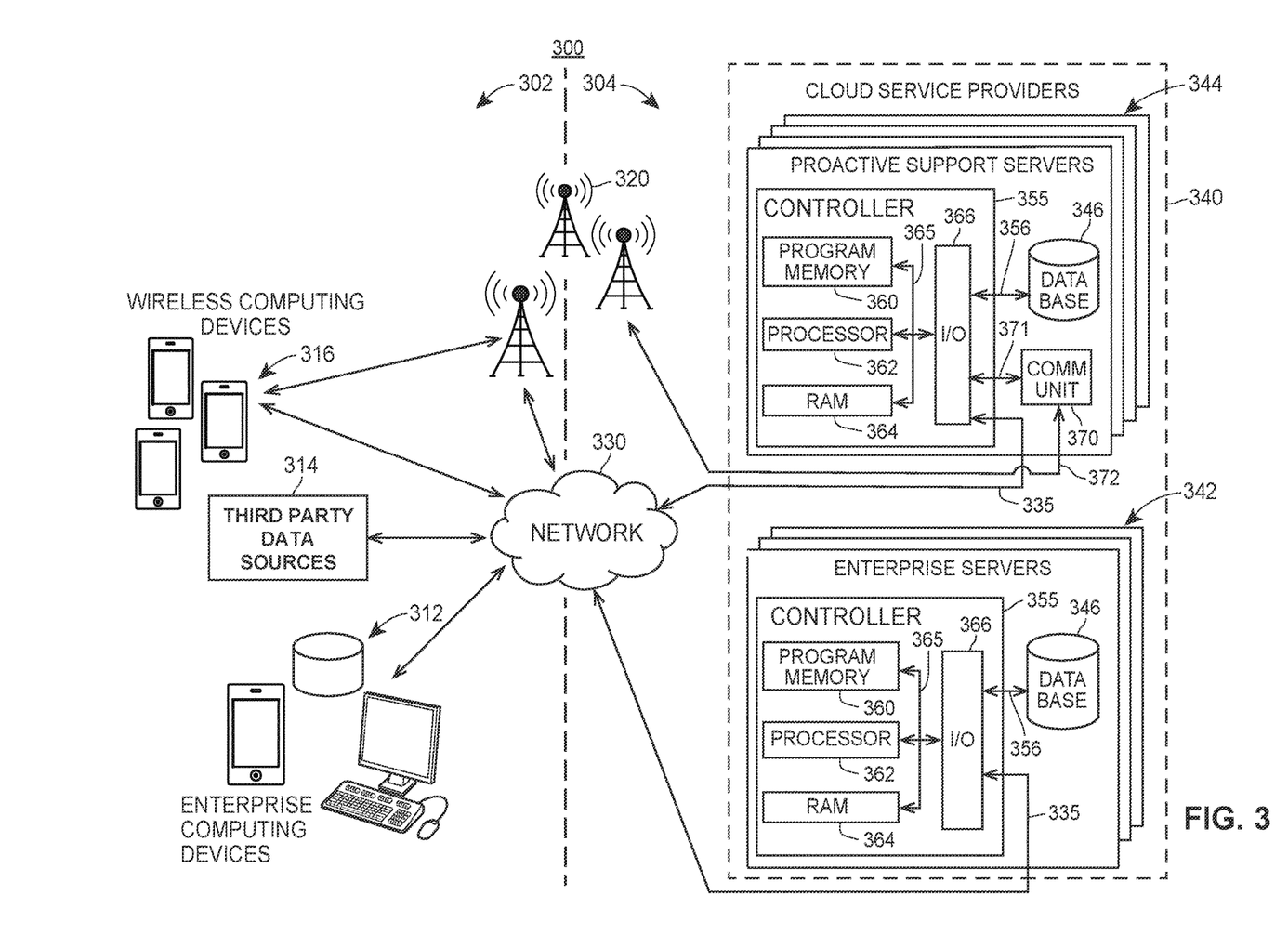
FIG. 3 illustrates a block diagram of an exemplary computing system showing hardware components and communication connections.

FIG. 3 illustrates a block diagram of an exemplary computing system 300 that may implement the techniques described herein, showing hardware components and communication connections. The various components of the computing system 300 are communicatively connected and configured to provide proactive monitoring and support of computing assets. The high-level architecture may include both hardware and software applications, as well as various data communications channels for communicating data between the various hardware and software components. The computing system 300 may be roughly divided into front-end components 302 and back-end components 304. The front-end components 302 may be associated with users, developers, administrators, data sources, and data consumers. The back-end components 304 may be associated with server assets for receiving, storing, and processing data, which may include enterprise server 342 and public or private cloud computing servers 344.

The front-end components 302 may include a plurality of computing devices (e.g., endpoint computing devices associated with end users) configured to communicate with the back-end components 304 via a network 330. Various computing devices (including enterprise computing devices 312 or wireless computing devices 316) of the front-end components 302 may communicate with the back-end components 304 via the network 330 to generate and provide operating data and to receive and execute corrective scripts. Each such computing device may include a processor and program memory storing instructions to enable the computing device to interact with the back-end components 304 via the network 330, which may include special-purpose software (e.g., custom applications such as data collection agents) or general-purpose software (e.g., operating systems or web browser programs). As illustrated, the wireless computing devices 316 may communicate with the back-end components 304 via a cellular network 320, such as a 5G telecommunications network or a proprietary wireless communication network.

The physical hardware of the front-end components 302 may provide a plurality of software functionalities. Thus, the front-end components 302 may include a plurality of data sources that provide operating data or other information to the back-end components 304, such as data collection agents of the computing devices 312 and 316 and third party data sources 314. Such third party data sources 314 may include data repositories or knowledge bases providing information on known error conditions, vulnerabilities, exploits, or bugs from third party providers (e.g., software vendors or security consultants). Additionally, the front-end components 302 (e.g., a subset of the enterprise computing devices 312) may further provide developer or administrator access to the servers of the back-end components 304.

The back-end components 304 may comprise a plurality of proactive support servers 340 communicatively connected to the front end components 302 via the network 330 and/or the cellular network 320. One or more enterprise servers 342 may be operated directly by an enterprise to provide various information technology services, including proactive support services. Additionally or alternatively, cloud computing servers 344 associated with one or more cloud service providers may be used to provide some or all of the proactive support services described herein. Such cloud computing servers 344 may be particularly advantageously used to train machine learning models, due to the high levels of processing power required to train such models. Such proactive support servers may be centrally located at one location or may be distributed across a plurality of sites for improved reliability, reduced latency, or data residency requirements. As illustrated, some or all of the enterprise servers 342 and cloud computing servers 344 may communicate with the front-end components 302 via links 335 to the network 330, and the cloud computing servers 344 may further communicate with the front-end components 302 via links 372 to the cellular network 320. Additionally, the enterprise servers 342 may communicate with cloud computing servers 344 via the network 330. Individual servers or groups of servers of either the enterprise servers 342 or the cloud computing servers 344 may further communicate with other individual servers or groups of servers of the same respective enterprise servers 342 or cloud computing servers 344 via the network 330 (e.g., regional server groups of the same cloud service provider located at multiple sites may communicate with each other via the network 330).

Each server 342 or 344 includes one or more processors 362 adapted and configured to execute various software stored in one or more program memories 360 to provide aspects of the proactive support services, such as data collection and storage, machine learning, error condition analysis and reporting, corrective script generation and distribution, or associated routines and services. The servers 342 and 344 may further include databases 346, which may be local databases stored in memory of a particular server or network databases stored in network-connected memory (e.g., in a storage area network). Each enterprise server 342 and cloud computing 344 has a controller 355 that is operatively connected to the database 346 via a link 356 (e.g., a local bus or a local area network connection). It should be noted that, while not shown, additional databases may be linked to the controller 355 in a known manner. For example, separate databases may be used for various types of information, such as for collected operating data, for knowledge base information, for corrective scripts, or for data backup.

Each controller 355 includes a program memory 360, a processor 362 (which may be called a microcontroller or a microprocessor), a random-access memory (RAM) 364, and an input/output (I/O) circuit 366, all of which may be interconnected via an address/data bus 365. It should be appreciated that although only one processor 362 is shown for each controller 355, the controller 355 may include multiple processors 362. Similarly, the memory of the controller 355 may include multiple RAMs 364 and multiple program memories 360. Although the I/O circuit 366 is shown as a single block, it should be appreciated that the I/O circuit 366 may include a number of different types of I/O circuits. The RAM 364 and program memories 360 may be implemented as semiconductor memories, magnetically readable memories, or optically readable memories, for example. The controller 355 may also be operatively connected to the network 330 via a link 335.

Some cloud computing servers 344 may be communicatively connected to the cellular network 320 via a communication unit 370 configured to establish, maintain, and communicate through the cellular network 320. The communication unit 370 may be operatively connected to the I/O circuit 366 via a link 371 and may further be communicatively connected to the cellular network 320 via a link 372. In some embodiments, some enterprise servers 242 or cloud computing servers 344 may be communicatively connected to the cellular network 320 through the network 330 via the link 335.

The servers 342 and 344 further include software stored in their program memories 360. The software stored on and executed by servers 342 and 344 performs functions relating to monitoring operating data of computing devices and identify and remediating error conditions of some of the computing devices, in accordance with the methods and implementations described herein. Further software may be stored at and executed by controllers 355 of enterprise servers 342 and cloud computing servers 344 in various embodiments, such as cloud-based applications running in such cloud computing environments.

The various computing devices (e.g., enterprise computing devices 312 and wireless computing devices 316) and third party data sources 314 of the front-end components 302 communicate with the back-end components 304 via wired or wireless connections of the network 330 and/or via the cellular network 320. The network 330 may be a proprietary network, a secure public internet, a virtual private network or some other type of network, such as dedicated access lines, plain ordinary telephone lines, satellite links, cellular data networks, or combinations of these. The network 330 may include one or more radio frequency communication links, such as wireless communication links with front-end components 302. The network 330 may also include other wired or wireless communication links with other computing devices or systems. Where the network 330 may include the Internet, and data communications may take place over the network 330 via an Internet communication protocol.

Although the computing system 300 is shown to include one or a limited number of the various front-end components 302 and of the back-end components 304, it should be understood that different numbers of any or each of these components may be utilized in various embodiments.

Although individual operations of one or more methods are illustrated and described as separate operations, one or more of the individual operations may be performed concurrently, and nothing requires that the operations be performed in the order illustrated. Structures and components presented as separate components in example configurations may be implemented as a combined structure or component. Similarly, structures and components presented as a single component may be implemented as separate components.

These and other variations, modifications, additions, and improvements fall within the scope of the subject matter herein.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this disclosure is referred to in this disclosure in a manner consistent with a single meaning, that is done for the sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

What is claimed:

1. A method for proactive support of computing assets, comprising:
   collecting, by one or more processors, operating data from a plurality of computing devices;
   generating, by the one or more processors, a device status data set comprising a plurality of entries for each of the plurality of computing devices based at least in part upon the operating data, the device status data set comprising normal operating entries for each of the computing devices and error condition entries for at least some of the computing devices;
   identifying, by the one or more processors, one or more predictive indicators associated with an error condition based upon the device status data set, wherein the one or more predictive indicators comprise an indication of a mismatch between a first version or a first setting of a first software application and a second version or a second setting of a second application;
   identifying, by the one or more processors, a subset of the plurality of computing devices comprising one or more affected computing devices matching the one or more predictive indicators; and
   causing, by the one or more processors, a corrective script to be executed for each of the one or more affected computing devices to adjust operation of the respective affected computing device, wherein the corrective script is configured to adjust operation relating to at least one of the one or more predictive indicators to remediate the error condition by changing at least one of the first version or the first setting of the first software application or the second version or the second setting of the second application.

2. The method of claim 1, wherein collecting the operating data from the plurality of computing devices comprises:
   installing, by the one or more processors, one or more data collection agents on each of the plurality of computing devices, wherein the one or more data collection agents execute to send event logs of events at the respective computing device; and
   receiving, at the one or more processors from the one or more data collection agents, the operating data including the event logs.

3. The method of claim 1, wherein the operating data for each of the plurality of computing devices includes a log of events occurring during operation of the respective computing device, a hardware profile for the respective computing device, and a list of adjustable operating parameters of the respective computing device.

4. The method of claim 1, wherein identifying the one or more predictive indicators comprises:
   training, using the device status data set, a machine learning model to predict each of a plurality of error conditions indicated by the error condition entries within the device status data set, the plurality of error conditions including the error condition; and
   determining the one or more predictive indicators based upon the trained machine learning model, wherein the one or more predictive indicators are input variables within the trained machine learning model.

5. The method of claim 1, wherein identifying each of the one or more affected computing devices of the subset of the plurality of computing devices comprises:
   generating a predicted error condition score for each of the one or more affected computing devices; and
   determining the respective predicted error condition score of each of the one or more affected computing devices exceeds a threshold.

6. The method of claim 1, further comprising:
   determining, by the one or more processors, a preventive solution to the error condition is identified in a knowledge base as a known solution based upon previous analysis; and
   selecting, by the one or more processors, the corrective script from the knowledge base based upon the error condition and the one or more predictive indicators.

7. The method of claim 1, further comprising:
   adding, by the one or more processors, an indication of a preventive solution to the error condition to a knowledge base as a known solution, wherein the indication of the preventive solution indicates (i) the one or more predictive indicators associated with the error condition and (ii) the corrective script.

8. The method of claim 1, wherein causing the corrective script to be executed for each respective affected computing device comprises remotely controlling the affected computing device to run the corrective script in an administrator session with elevated permissions while the affected computing device is not otherwise being used.

9. The method of claim 1, wherein causing the corrective script to be executed for each of the one or more affected computing devices comprises:
   sending, by the one or more processors, the corrective script to each of the one or more affected computing devices, wherein each respective affected computing device is configured to execute the corrective script upon receipt.

10. The method of claim 1, wherein causing the corrective script to be executed for each of the one or more affected computing devices comprises:
    sending, by the one or more processors, the corrective script to each of the one or more affected computing devices, wherein one or more data collection agents of each respective affected computing device are configured to (i) detect one or more trigger conditions associated with the corrective script and (ii) execute the corrective script upon detection of the one or more trigger conditions.

11. A computer system for proactive support of computing assets, comprising:
    one or more processors;
    a program memory operatively connected to the one or more processors and storing executable instructions that, when executed by the one or more processors, cause the computer system to:
- collect operating data from a plurality of computing devices;
- generate a device status data set comprising a plurality of entries for each of the plurality of computing devices based at least in part upon the operating data, the device status data set comprising normal operating entries for each of the computing devices and error condition entries for at least some of the computing devices;
- identify one or more predictive indicators associated with an error condition based upon the device status data set, wherein the one or more predictive indicators comprise a mismatch between a first version or a first setting of a first software application and a second version or a second setting of a second application;
- identify a subset of the plurality of computing devices comprising one or more affected computing devices matching the one or more predictive indicators; and
- cause a corrective script to be executed for each of the one or more affected computing devices to adjust operation of the respective affected computing device, wherein the corrective script is configured to adjust operation relating to at least one of the one or more predictive indicators to remediate the error condition by changing at least one of the first version or the first setting of the first software application or the second version or the second setting of the second application.

12. The computer system of claim 11, wherein the executable instructions that cause the computer system to collect the operating data from the plurality of computing devices cause the computer system to:
- install one or more data collection agents on each of the plurality of computing devices, wherein the one or more data collection agents execute to send event logs of events at the respective computing device; and
- receive the operating data including the event logs from the one or more data collection agents.

13. The computer system of claim 11, wherein the operating data for each of the plurality of computing devices includes a log of events occurring during operation of the respective computing device, a hardware profile for the respective computing device, and a list of adjustable operating parameters of the respective computing device.

14. The computer system of claim 11, wherein the executable instructions that cause the computer system to identify the one or more predictive indicators cause the computer system to:
- train, using the device status data set, a machine learning model to predict each of a plurality of error conditions indicated by the error condition entries within the device status data set, the plurality of error conditions including the error condition; and
- determine the one or more predictive indicators based upon the trained machine learning model, wherein the one or more predictive indicators are input variables within the trained machine learning model.

15. The computer system of claim 11, wherein the executable instructions that cause the computer system to identify each of the one or more affected computing devices of the subset of the plurality of computing devices cause the computer system to:
- generate a predicted error condition score for each of the one or more affected computing devices; and
- determine the respective predicted error condition score of each of the one or more affected computing devices exceeds a threshold.

16. A tangible, non-transitory computer-readable medium storing executable instructions for proactive support of computing assets that, when executed by one or more processors of a computer system, cause the computer system to:
- collect operating data from a plurality of computing devices;
- generate a device status data set comprising a plurality of entries for each of the plurality of computing devices based at least in part upon the operating data, the device status data set comprising normal operating entries for each of the computing devices and error condition entries for at least some of the computing devices;
- identify one or more predictive indicators associated with an error condition based upon the device status data set, wherein the one or more predictive indicators comprise a mismatch between a first version or a first setting of a first software application and a second version or a second setting of a second application;
- identify a subset of the plurality of computing devices comprising one or more affected computing devices matching the one or more predictive indicators; and
- cause a corrective script to be executed for each of the one or more affected computing devices to adjust operation of the respective affected computing device, wherein the corrective script is configured to adjust operation relating to at least one of the one or more predictive indicators to remediate the error condition by changing at least one of the first version or the first setting of the first software application or the second version or the second setting of the second application.

17. The tangible, non-transitory computer-readable medium of claim 16, wherein the executable instructions that cause the computer system to collect the operating data from the plurality of computing devices cause the computer system to:
- install one or more data collection agents on each of the plurality of computing devices, wherein the one or more data collection agents execute to send event logs of events at the respective computing device; and
- receive the operating data including the event logs from the one or more data collection agents.

18. The tangible, non-transitory computer-readable medium of claim 16, wherein the executable instructions that cause the computer system to identify the one or more predictive indicators cause the computer system to:
- train, using the device status data set, a machine learning model to predict each of a plurality of error conditions indicated by the error condition entries within the device status data set, the plurality of error conditions including the error condition; and
- determine the one or more predictive indicators based upon the trained machine learning model, wherein the one or more predictive indicators are input variables within the trained machine learning model.

19. The tangible, non-transitory computer-readable medium of claim 16, wherein the executable instructions that cause the computer system to identify each of the one or more affected computing devices of the subset of the plurality of computing devices cause the computer system to:
- generate a predicted error condition score for each of the one or more affected computing devices; and determine the respective predicted error condition score of each of the one or more affected computing devices exceeds a threshold.

20. The tangible, non-transitory computer-readable medium of claim 16, wherein the executable instructions further cause the computer system to:
   determine a preventive solution to the error condition is identified in a knowledge base as a known solution based upon previous analysis; and
   select the corrective script from the knowledge base based upon the error condition and the one or more predictive indicators.

\* \* \* \* \*